United States Patent
Esmailian et al.

(10) Patent No.: US 8,842,767 B2
(45) Date of Patent: Sep. 23, 2014

(54) SYSTEM AND METHOD FOR UN-INTERRUPTED OPERATION OF COMMUNICATIONS DURING INTERFERENCE

(75) Inventors: Tooraj Esmailian, Irvine, CA (US); Scott Powell, Newport Beach, CA (US); Chung Ming Tu, Irvine, CA (US); KuoRuey Han, Irvine, CA (US); Kadir Dinc, Irvine, CA (US); German Feyh, Boulder, CO (US)

(73) Assignee: Broadcom Corporation, Irvine, CA (US)

( * ) Notice: Subject to any disclaimer, the term of this patent is extended or adjusted under 35 U.S.C. 154(b) by 826 days.

(21) Appl. No.: 12/771,722

(22) Filed: Apr. 30, 2010

(65) Prior Publication Data

US 2011/0103459 A1    May 5, 2011

Related U.S. Application Data

(60) Provisional application No. 61/257,982, filed on Nov. 4, 2009.

(51) Int. Cl.
H04B 15/00        (2006.01)

(52) U.S. Cl.
USPC .......................................... 375/285; 375/229

(58) Field of Classification Search
USPC ........................... 375/229–234, 284–285, 296
See application file for complete search history.

(56) References Cited

U.S. PATENT DOCUMENTS

| | | | |
|---|---|---|---|
| 5,337,261 A * | 8/1994 | Rogers | 702/190 |
| 5,758,275 A * | 5/1998 | Cox et al. | 455/307 |
| 5,796,848 A * | 8/1998 | Martin | 381/320 |
| 5,872,807 A * | 2/1999 | Booth et al. | 375/130 |
| 6,121,778 A | 9/2000 | Moore | |
| 6,154,710 A | 11/2000 | Kobayashi et al. | |
| 6,463,041 B1 | 10/2002 | Agazzi | |
| 2002/0181633 A1* | 12/2002 | Trans | 375/354 |
| 2003/0026369 A1* | 2/2003 | Murray et al. | 375/355 |

(Continued)

FOREIGN PATENT DOCUMENTS

| CN | 101458283 A | 6/2009 |
|---|---|---|
| CN | 101536343 A | 9/2009 |
| WO | WO 2008/074923 A1 | 6/2008 |

OTHER PUBLICATIONS

Office Action, dated Mar. 5, 2013, for Chinese Patent Appl. No. 201010532163.6, 6 pages.

(Continued)

Primary Examiner — Emmanuel Bayard
(74) Attorney, Agent, or Firm — Sterne, Kessler, Goldstein & Fox PLLC

(57) ABSTRACT

Methods and systems to substantially eliminate effects of EMI burst noise in an Ethernet system are provided herein. The method includes the step of computing and storing filter coefficients configured to adapt to a range of EMI frequencies. The method further comprises the step of receiving a signal and detecting EMI and frequency of the EMI in the received signal. The method further comprises selecting filter coefficients corresponding to the determined frequency of the detected EMI and adjusting a frequency response of one or more filters using the selected filter coefficients so as to substantially eliminate effects of the EMI in the received signal. The method further includes the step of sending filter coefficients to a link partner corresponding to the frequency of the detected EMI.

33 Claims, 9 Drawing Sheets

(56) References Cited

U.S. PATENT DOCUMENTS

| | | | |
|---|---|---|---|
| 2007/0121718 A1* | 5/2007 | Wang et al. | 375/233 |
| 2007/0230658 A1 | 10/2007 | Okada et al. | |
| 2008/0104158 A1* | 5/2008 | Farhoodfar et al. | 708/405 |
| 2008/0232453 A1* | 9/2008 | Cohen et al. | 375/232 |
| 2008/0260071 A1* | 10/2008 | Sidiropoulos et al. | 375/334 |
| 2009/0103669 A1 | 4/2009 | Kolze et al. | |
| 2009/0161803 A1* | 6/2009 | Huang et al. | 375/345 |
| 2009/0196336 A1* | 8/2009 | Huang et al. | 375/232 |
| 2010/0080279 A1* | 4/2010 | Saints et al. | 375/232 |
| 2010/0098216 A1* | 4/2010 | Dobson | 378/104 |
| 2011/0021170 A1* | 1/2011 | Kolze et al. | 455/296 |
| 2011/0051819 A1* | 3/2011 | Lin et al. | 375/257 |
| 2012/0082203 A1* | 4/2012 | Zerbe et al. | 375/233 |
| 2012/0201288 A1* | 8/2012 | Kolze et al. | 375/232 |

OTHER PUBLICATIONS

Office Action, dated Oct. 11, 2013, for Chinese Patent Appl. No. 201010532163.6, 4 pages.

Office Action, dated Dec. 18, 2013, for Taiwanese Patent Appl. No. 099137879, 5 pages.

* cited by examiner

| 0 | 1 | 0 | 1 | 0 | 1 | 0 | 1 | 0 | 1 | 0 | 1 |   No EMI detected

FIG. 5A

| 0 | 1 | 1 | 1 | 0 | 1 | 0 | 1 | 0 | 1 | 0 | 1 |   No EMI detected

FIG. 5B

| 0 | 1 | 1 | 1 | 1 | 0 | 0 | 1 | 0 | 1 | 0 | 1 |   EMI detected

FIG. 5C

SYSTEM AND METHOD FOR UN-INTERRUPTED OPERATION OF COMMUNICATIONS DURING INTERFERENCE

CROSS-REFERENCE TO RELATED APPLICATIONS

This application claims the benefit of U.S. Provisional Application No. 61/257,982 filed on Nov. 4, 2009, which is incorporated herein by reference in its entirety.

BACKGROUND OF THE INVENTION

1. Field of the Invention

This application is generally related to detecting and eliminating effects of interference in communication systems.

2. Background Art

Interference signals such as Electromagnetic Interference (EMI) often include narrowband signals centered at one or more frequencies. The frequency can be as low as a few MHz and as high as a few GHz. HAM radios, Walkie-Talkies and emergency vehicle sirens are examples of devices that generate EMI that impedes communications. These types of signals are transient and may cause a link drop or un-acceptable Bit Error Rate (BER) in a communication system. For example, a 10 GBASE-T system is sensitive to EMI signals that fall in its operating band of near DC to ~400 MHz. 10 GBASE-T systems are more sensitive to EMI because the communication channel between a link and link partner in a 10 GBASE-T system is typically operating very close to the channel capacity to allow for a high data rate. In the event of EMI bursts, such sensitive channels are known to drop a communication link between a link and a link partner.

Method and systems are needed to overcome the above mentioned deficiencies.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 1A illustrates an exemplary bi-directional communication system.

FIG. 1B further illustrates the bi-directional communication system of FIG. 1A.

FIG. 5A-C illustrates an example sequence of bit patterns transmitted to a link partner to indicate whether EMI is present or absent.

Figure 6:
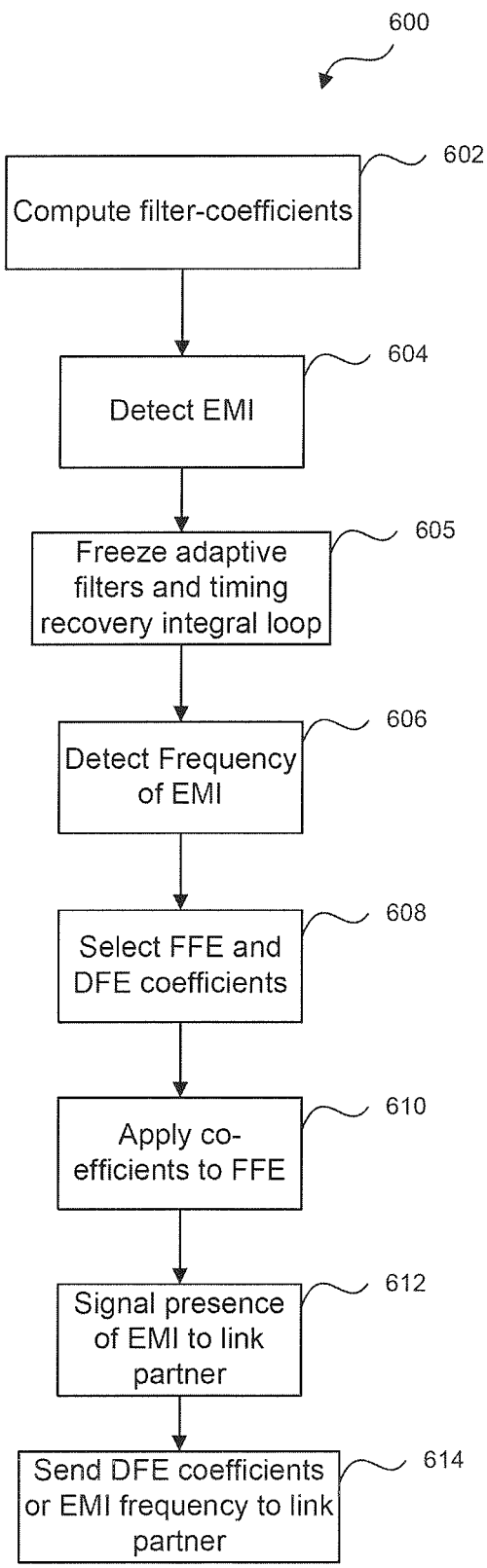

FIG. 6 illustrates an example flowchart that depicts steps performed by a PHY layer receiver to substantially eliminate EMI according to an exemplary embodiment.

Figure 7:
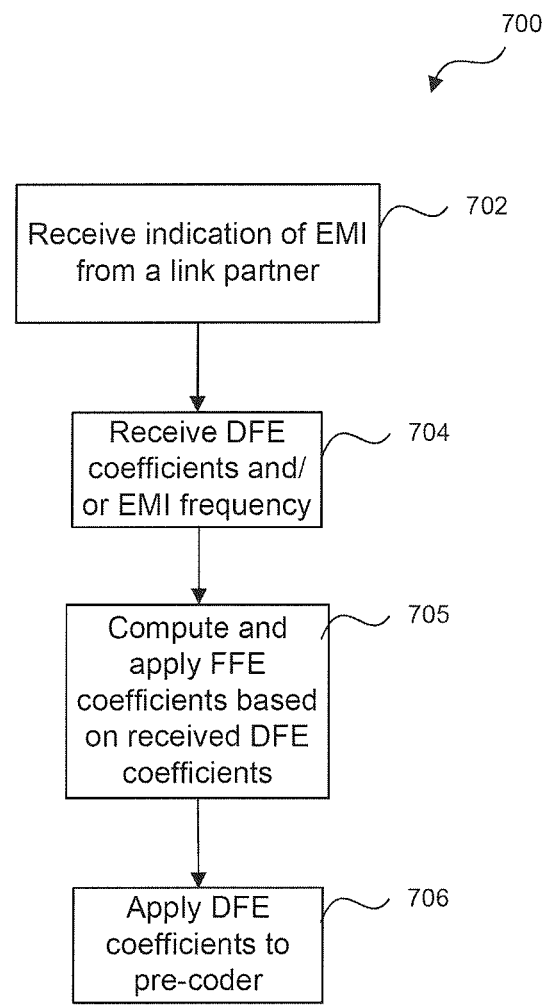

FIG. 7 illustrates an example flowchart that depicts steps performed by a PHY layer upon receiving indication of EMI from a link partner according to an exemplary embodiment.

Figure 8:
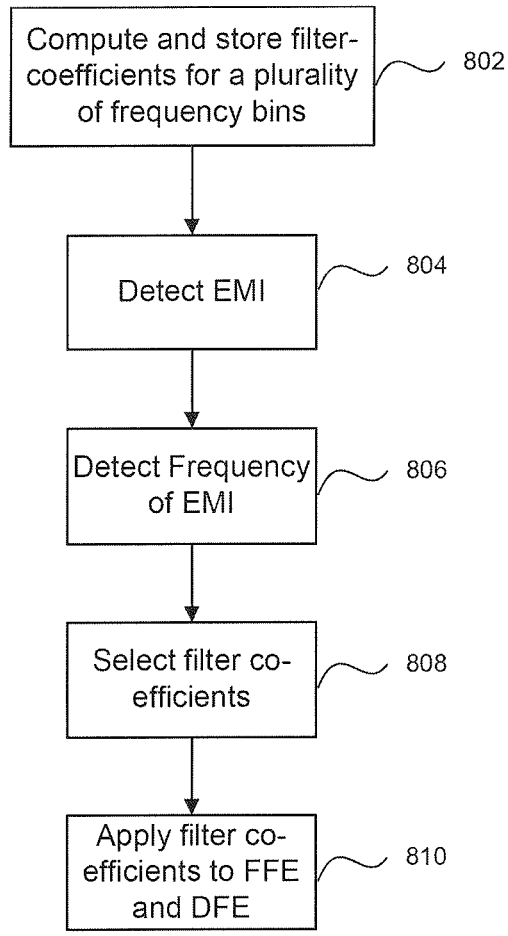

FIG. 8 illustrates an example flowchart that depicts steps performed by a PHY transceiver to substantially eliminate effect of EMI from a received signal according to an exemplary embodiment.

The present invention will now be described with reference to the accompanying drawings. In the drawings, like reference numbers may indicate identical or functionally similar elements.

DETAILED DESCRIPTION OF THE INVENTION

Figure 1A:
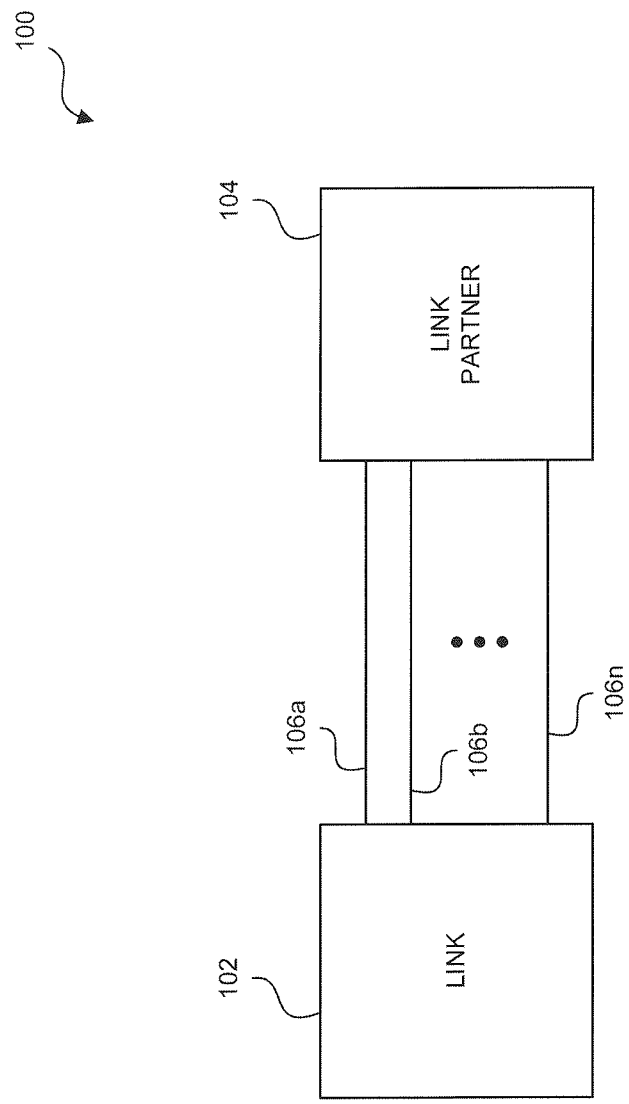

FIG. 1A illustrates an exemplary bi-directional communication system. Communication system 100 includes a link 102 and a link partner 104 coupled by conductor pairs 106a-n.

In an embodiment link 102 and link partner 104 are part of an Ethernet system, for example a 10 GBase-T Ethernet system. Each of conductor pairs 106 may be a balanced twisted pair conductor. It is to be appreciated that embodiments presented herein are not limited to Ethernet systems or twisted pair conductors and are applicable to any communication system. Link 102 and link partner 104 may be computing devices such as a personal computers, laptops, mobile communication devices or servers such as internet servers. The term "link partner" denotes the device on the other end of a communication link. For example, link 102 is the "link partner" of link partner 104 and link partner 104 is the "link partner" of link 102. Link 102 and link partner 104 are described further below with respect to FIG. 1B.

Figure 1B:
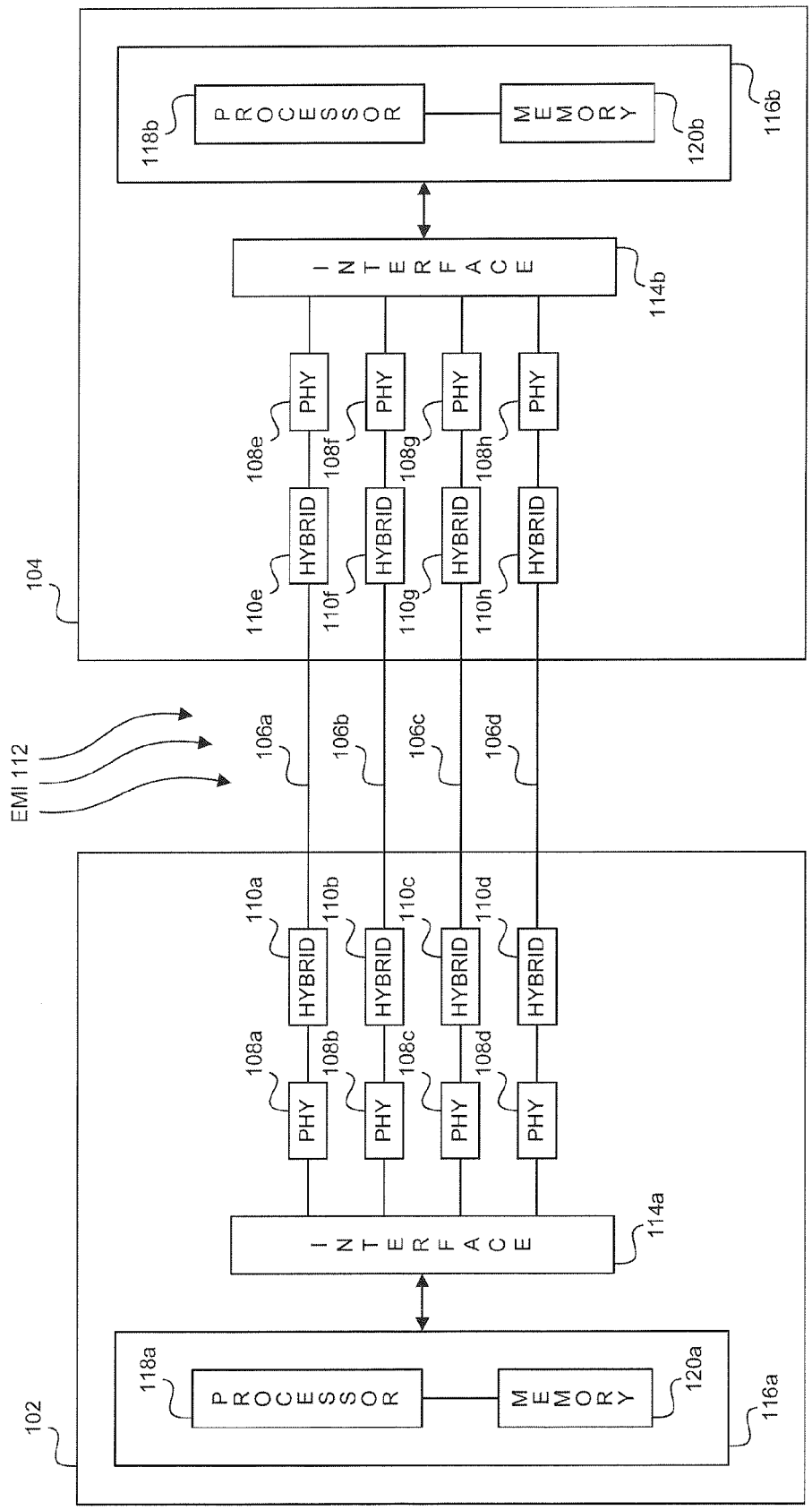

FIG. 1B further illustrates the bi-directional communication system of FIG. 1A. Each of link 102 and link partner 104 includes an interface 114, PHY 108, hybrid 110 and a computing device 116 that has processor 118 and a memory 120.

In link 102, computing device 116a is coupled to interface 114a. PHYs 108a-d are coupled to interface 114a. PHYs 108a-d are coupled to corresponding hybrids 110a-d. Hybrids 110a-d are coupled to hybrids 110e-h in link partner 104 via conductors pairs 106a-d. Hybrids 110e-h are coupled to corresponding PHYs 108e-h. PHYs 108e-h are coupled to interface 114b. Interface 114b is coupled to computing device 116b which includes processor 118b coupled to memory 120b.

High level application layers run on, for example processor 118 of computing device 116. Interface 114 couples PHY 108 to higher level layers such as a media access control (MAC) layer and application layers that run on computing device 116. PHY 108 (also referred to as a "PHY transceiver" herein) couples a link layer such as the MAC layer to physical media such as conductor pairs 106. In an example, embodiments presented herein are implemented in PHY 108. PHY 108 is described in further detail with respect to FIGS. 2-3 below. Hybrid block 110 ensures that a receiver 212 (see FIG. 2) in PHY 108 does not see what is simultaneously transmitted over each conductor pair 106 by a transmitter 200 (see FIG. 2) in full-duplex mode. In other words, each hybrid block 110 separates the transmit signal from the receive signal for each PHY 108.

Communication between link 102 and link partner 104 may be hindered by electro magnetic interference (EMI) 112. In previous versions of Ethernet systems that use copper PHYs, such as 10/100/1000 BASE-T systems, the channel capacity is much higher than the system data rate. These systems were relatively robust in the presence of EMI. However, EMI may be especially detrimental to communications in a 10 GBASE-T Ethernet systems. Data rates in typical 10 GBASE-T systems are very close to available channel capacity, thereby significantly reducing the signal-to-noise ratio (SNR) margin compared to SNR margins of 10/100/1000 BASE-T systems. Current 10 GBASE-T systems easily drop a communications link in the presence of even moderate EMI signals such as a signal generated by a Walkie-Talkie.

Network providers typically impose a block error rate stipulation on communication systems. For example, for Ethernet systems, network providers typically tolerate a block error rate of $10^{-2}$ in the presence of EMI, provided that a communication link between link 102 and link partner 104 is not dropped. The block error rate is computed using a moving window of 1 second by counting the number of blocks in error during a moving 1 second window. In this example, the percentage of blocks in error should not be more than 1%. Considering this stipulation, a communication system can be completely in error for 1% of the first 1 second window following the onset of EMI, and still be within the guidelines set for Ethernet systems, if in the remaining 99% of blocks are error free. Therefore, the first 10 ms after the onset of EMI can be used to detect and take corrective action to suppress the EMI. Errors which occur during the first 10 ms will not violate the above stipulation of acceptable system performance in the presence of EMI.

Effects of steady state narrowband EMI may be eliminated by using sufficiently long, properly tuned, forward and feedback equalizers. However, these equalizers do not suppress interference of a transient nature such as an EMI spike (see for example EMI spike 414 in FIG. 4B). Specifically, during the transition from no EMI present to EMI present, or during the transition from EMI at one frequency to EMI at a different frequency, EMI spikes such as spike 414 are observed. The interference due to EMI spikes is typically not suppressed until equalizers in PHY transceivers have had time to adapt. However, during the time required to adapt to an EMI spike, a receiver is very likely to receive an unacceptable number of errors and hence drop a communication link, for example, a communication link between link 102 and link partner 104. Decision directed adaptation may result in a high error rate that can cause an equalizer convergence failure. Furthermore, if a high error condition persists for an extended period of time, higher level layers may also drop the communication link. What is needed is a scheme to rapidly detect the onset of EMI and EMI spikes and robustly determine the appropriate equalization response in the presence of the EMI to keep higher level layers from dropping the communication link. Embodiments presented herein detect EMI spikes and adapt a system to account for the effects of the EMI spike within the pre-determined time period (e.g. a time period of 10 ms) that is acceptable to the relevant communications standard in use. It is to be appreciated that the block error rate and window of time to detect and adapt to EMI is a design requirement and may differ based on implementation and the type of communication system. It is to be appreciated that the embodiments presented herein are applicable to any communications system.

To overcome the long felt need for a robust communication system that can detect and eliminate effects of EMI, the inventors have provided the embodiments presented herein to detect and eliminate the effects of EMI burst noise. According to an embodiment, prior to the onset of EMI at a given frequency (or set of frequencies), optimal filter coefficients and equalizer responses are determined for a range of assumed EMI frequencies. The frequency response of equalizers is based on filter coefficients that are pre-computed for a range of frequencies and may be stored in a table (e.g. table 1 below) of equalized frequency responses. In an embodiment, the range of EMI frequencies for which filter coefficients are computed within a selected range of the bandwidth of the communication system, for example ~0 MHz-~400 MHz for 10 GBASE-T Ethernet. This is because EMI outside of the operational band may not affect performance of the communication system considerably. Each table entry may include filter coefficients or other equalizer parameters for the physical channel for multiple EMI frequencies. In alternate embodiments equalizer responses and filter coefficients are computed on-the-fly or in real time. The time required to compute equalizers can be significantly reduced using an analytical channel inversion based approach. The table of coefficients and equalizers may be updated from time to time to account for variations in the physical channel (e.g. variations in conductor pairs 106).

Upon detection of EMI and its frequency, the frequency response of one or more filters is modified using coefficients in the table that corresponds to the closest frequency to the detected EMI frequency. If a portion of the channel equalization is in the link partner's transmitter (as is the case for 10 GBASE-T), then the frequency of detected EMI and/or filter coefficients are communicated to the link partner using a signaling scheme which is robust in the presence of un-suppressed EMI. Embodiments presented herein are substantially implemented at PHY layer 108 and are further described below with respect to FIGS. 2 and 3.

Figure 2:
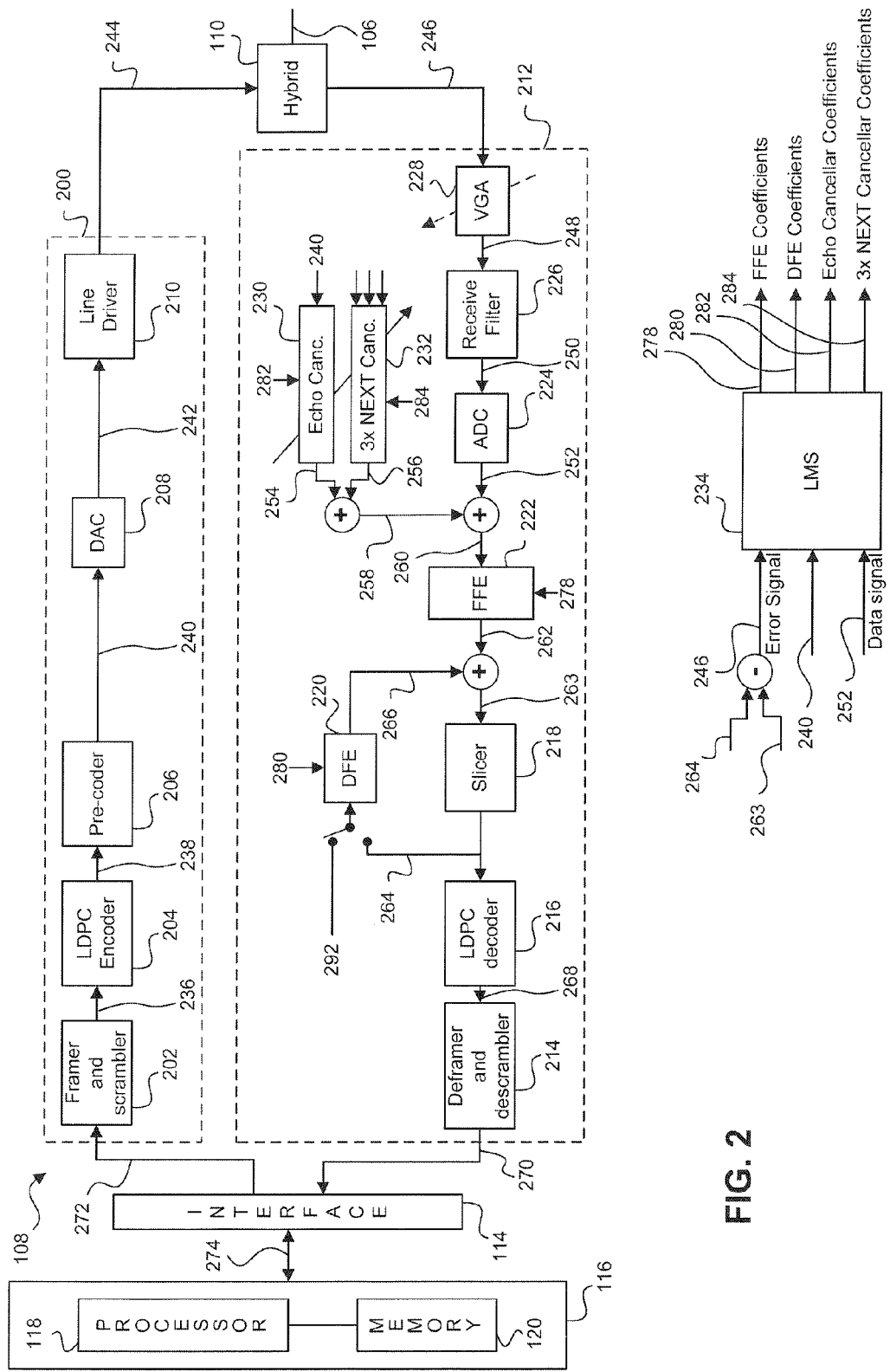
FIG. 2 illustrates a Physical Layer (PHY) transceiver.

FIG. 2 illustrates an exemplary PHY 108. PHY 108 includes a transmitter 200 and a receiver 212.

The input of transmitter 200 is coupled to interface 114 and the output is coupled to hybrid 110. The input of receiver 212 is coupled to the output of hybrid 110 and the output of receiver 212 is coupled to the input of interface 114. Transmitter 200 includes framer and scrambler 202, low-density-parity-check (LDPC) encoder 204, pre-coder 206, digital-to-analog converter (DAC) 208 and line driver 210. The input of LDPC encoder 204 is coupled to the output of framer and scrambler 202. The input of pre-coder 206 is coupled to the output of LDPC encoder 204. The input of digital-to-analog converter 208 is coupled to the output of pre-coder 206. The input of line driver 210 is coupled to the output of digital-to-analog converter 208. The input of hybrid 110 is coupled to the output of line driver 210. In an example, transmitter 200 receives data for transmission from application layers running on computing device 116.

In operation, an application layer program running on processor 118 sends data for transmission via link 274 to interface 114. Interface 114 sends data 272 to framer and scrambler 202. Framer and scrambler 202 scrambles data 272 and appends frames, based on the communication protocol in use, to data 272 to generate framed data 236. LDPC encoder 204 generates and appends parity bits to framed data 236 and generates encoded data 238. Pre-coder 206 pre-shapes encoded data 238 to account for Inter Symbol Interference (ISI) during transmission such that a receiver at a link partner does not experience channel effects due to ISI. In an example, pre-coder 206 is a Tomlinson-Harashima pre-coder. Pre-coder 206 pre-shapes encoded data 238 to generate pre-shaped signal 240. Digital-to-analog converter 208 converts pre-shaped signal 240 into analog signal 242. Line driver 210 amplifies analog signal 242 to generate transmission signal 244. Hybrid 110 separates transmit signal 244 from receive signal 246.

Receiver 212 includes de-framer and de-scrambler 214, LDPC decoder 216, decision feedback equalizer (DFE) 220, slicer 218, feed forward equalizer (FFE) 222, echo canceller 230, 3× Near End Cross Talk (NEXT) canceller 232, analog-to-digital converter 224, receive filter 226 and variable gain amplifier (VGA) 228. Variable gain amplifier 228 receives data on conductor pair 106 via hybrid 110. The input of receive filter 226 is coupled to the output of variable gain amplifier 228. The input of analog-to-digital converter 224 is coupled to the output of receive filter 226. The input of feed forward equalizer 222 is coupled to the outputs of echo canceller 230, 3× NEXT canceller 232 and analog-to-digital-converter 224. The input of slicer 218 is coupled to the outputs of decision feedback equalizer 220 and feed forward equalizer 222. The input of LDPC decoder 216 is coupled to the output of slicer 218. The input of de-framer and de-scrambler 214 is coupled to the output of LDPC decoder 216. The input of interface 114 is coupled to the output of de-framer and de-scrambler 214. Receiver 212 sends data received from a link partner to computing device 116 for processing. Receiver 212 also includes Least Means Squared Unit 234 that is coupled to slicer 218, analog-to-digital converter 224, feed forward equalizer 222, decision feedback equalizer 280, echo canceller 230 and 3× NEXT canceller 232.

In operation, receiver 212 receives signal 246 from conductor pair 106 via hybrid 110. Variable gain amplifier 228 amplifies received signal 246 to generate amplified signal 248. Receive filter 226 filters amplified signal 248 to remove noise and generate filtered signal 250. Analog-to-digital converter 224 converts filtered signal 250 into digital signal 252. Echo canceller 230 generates echo cancellation signal 254, based on pre-shaped signal 240, to remove interference introduced due to a signal 244 that is transmitted by transmitter 200. 3× NEXT canceller 232 generates 3× NEXT cancellation signal 256 to cancel interference effects of transmissions and receptions by adjoining conductors pairs. For example, transmissions and receptions on conductor pairs 106b-d will interfere with any signal received on conductor pair 106a. These interferences are accounted for by 3× NEXT cancellation signal 256. Echo cancellation signal 254 and 3× NEXT cancellation signal 256 are combined to form cancellation signal 258. Cancellation signal 258 is combined with digital signal 252 to form adapted signal 260 which is fed into feed forward equalizer 222. Feed forward equalizer 222 cancels pre-cursor ISI in adapted signal 260 to generate shaped signal 262.

During startup, decision feedback equalizer 220 outputs feedback signal 266 that is based on sliced signal 264 or a training sequence 292. Decision feedback equalizer 220 removes post-cursor ISI from sliced signal 264. The DFE coefficients 280 are generated by least-mean-square (LMS) unit 234. In an embodiment, decision feedback equalizer 220 is operational only during startup and is deactivated after startup. DFE coefficients 280 are then used by the pre-coder 206 on a link partner side to remove post-cursor ISI. DFE coefficients 280 can be applied to pre-coder 206 because the DFE 220 and pre-coder 206 are mathematically equivalent.

Feedback signal 266 is combined with shaped signal 262 to generate slicer input signal 263. Slicer input signal 263 is sliced by slicer 218 which separates signal 263 into multiple digital levels and generates sliced signal 264. LDPC decoder 216 uses parity bits in sliced signal 264 to correct for errors and strips the parity bits from sliced signal 264 to form decoded signal 268. Deframer and descrambler 214 descrambles decoded signal 268 and extracts data from frames in decoded signal 268 to generate data signal 270. Data signal 270 is transmitted to processor 118 in computing device 116 for processing via interface 114.

Receiver 212 also includes LMS unit 234. LMS unit 234 receives error signal 246, pre-shaped signal 240 and digital signal 252 as inputs. In an embodiment a data signal other than digital signal 252 may be used. In an example, error signal 246 is the difference between sliced signal 264 and slicer input signal 263. In other embodiments error signal may be another signal. LMS unit 234 generates feed forward equalizer (FFE) coefficients 278, decision feedback equalizer (DFE) coefficients 280, echo canceller coefficients 282, and 3× NEXT canceller coefficients 284. Feed forward equalizer coefficients 278, decision feedback equalizer coefficients 280, echo canceller coefficients 282, and 3× NEXT canceller coefficients 284 determine the frequency response of feed forward equalizer 222, decision feedback equalizer 280, echo canceller 230 and 3× NEXT canceller 232 respectively. As will be described further below with respect to FIG. 3, embodiments presented herein may: (1) pre-compute and store feed forward equalizer coefficients 278 and decision feedback equalizer coefficients 280 for multiple potential EMI frequencies prior to the actual onset of EMI; (2) detect EMI and adapt FFE and DFE (for example adapt FFE and DFE coefficients); (3) signal presence of EMI to a link partner; and (4) send DFE coefficients and/or EMI frequency to a link partner.

Figure 3:
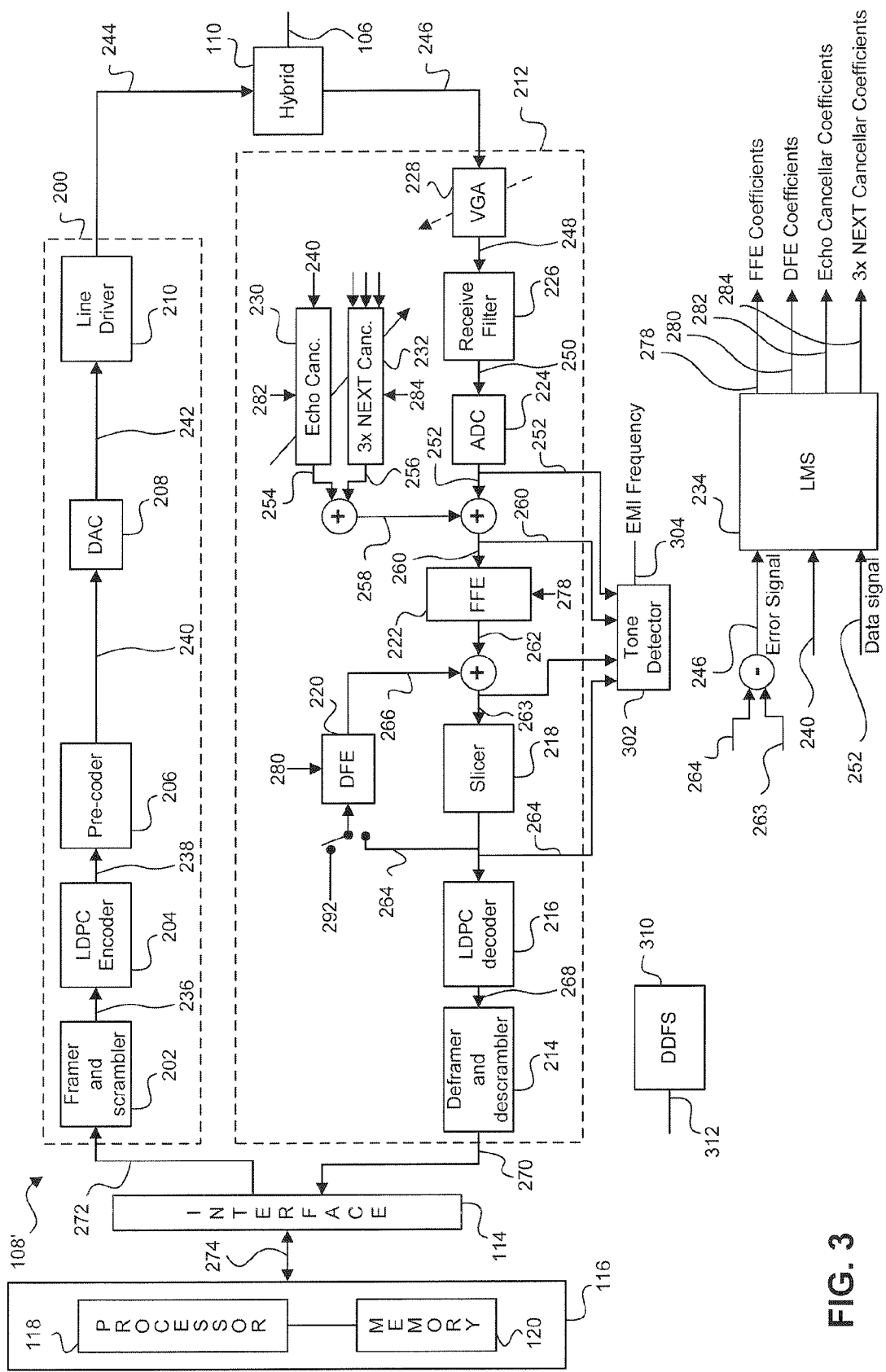
FIG. 3 illustrates a PHY transceiver to detect and substantially eliminate effects of EMI to allow for un-interrupted communication according to an exemplary embodiment.

FIG. 3 illustrates an example PHY 108' according to an exemplary embodiment. PHY 108' includes, in addition to the elements described above with respect to PHY 108 of FIG. 2, a tone detector 302 and a direct digital frequency synthesizer (DDFS) 310.

1. Pre-Computing Filter Coefficients

In an embodiment, FFE coefficients 278 and DFE coefficients 280 are computed by the LSM unit 234 during startup before the onset of EMI for a range of frequencies and stored in a memory (not shown) in the LMS unit 234 or in memory 120. In another embodiment, FFE coefficients and DFE coefficients are computed by processor 118 during startup before the onset of EMI for a range of frequencies and stored in memory 120, or any other available memory. In a further embodiment, FFE coefficients 278 and DFE coefficients 280 are computed in real time by LMS unit 234 or processor 118 corresponding to a determined EMI frequency.

In an example, FFE coefficients 278 and DFE coefficients 280 are computed for multiple frequency bins. If F is the frequency bandwidth of a communication system and N is the desired number of frequency bins for EMI, then the width (W) of each frequency bin is W=F/N. For example, in a 10 GBase-T system with a bandwidth of 400 MHz, if 128 bins are desired then the width W of each bin is given by 400/128=3.125 MHz. The width W of each frequency bin in this case is much wider than the bandwidth of any potential EMI signal. In embodiments presented herein a frequency response of a FFE 222 and DFE 280 are modified upon detection of EMI to include a notch with a width of a single or multiple bins to notch out any detected EMI and substantially eliminate effects of the EMI from the received signal. The DFE and FFE coefficients may be selected based on the frequency of the detected EMI. For example, if EMI is detected at 151 MHz, FFE and DFE coefficients with a notch in the frequency bin ranging from 150 MHz to 153.125 MHz may be selected to notch out the EMI.

In an embodiment, during system startup and prior to the onset of EMI, FFE coefficients and DFE coefficients are computed assuming that an EMI signal is located at the center of a first frequency bin. Based on this assumption, FFE coefficients and DFE coefficients are computed, for example using an analytical channel inversion method, and stored in memory, for example, memory 120. Then, assuming that EMI is located at the center of the second frequency bin, FFE coefficients and DFE coefficients are computed and also stored in memory. This process is repeated for each bin. The computed FFE coefficients and DFE coefficients may be stored in a table indexed by the EMI frequency bins as shown below in table 1.

TABLE 1

| EMI Frequency bins | DFE coefficients | FFE Coefficients |
|---|---|---|
| 0 to 3 MHz | A | B |
| 3 to 6 Mhz | C | D |
| . | . | . |
| . | . | . |
| . | . | . |
| 150 to 153.125 | L | M |
| . | . | . |
| . | . | . |
| . | . | . |
| 396.875 to 400 Mhz | X | Y |

In Table 1 above, the width of the frequency bins is uniform. It is to be appreciated that alternatively, embodiments presented herein are also applicable when the width of frequency bins are non-uniform.

In Table 1 above, each entry represents coefficients of a filter. For example, A may represent 16 coefficients that are required to adapt a DFE 220 to notch-out EMI in the range of 0 to 3 MHz. The number of coefficients are the same as the number of taps of the filter. Similarly B may represent, for example, 128 coefficients that are required to adapt a FFE 222 to notch-out EMI in the range of 0 to 3 Mhz. In an example, if the number of bins is 128 and if the number of coefficients is 144 per bin (128 for FFE 222 and 16 for DFE 220) then for N=128, coefficient storage require at most 4*128*(128+16) =73,728 words. One possible way to reduce the required memory is to save only DFE coefficients and when the frequency of EMI signal 112 is detected, compute/adapt the FFE coefficients based on the known DFE coefficients corresponding to the detected EMI frequency. In this example, the required memory would be reduced to accommodate 4*128*16=8,192 words. In order to account for timing drift or other changes in the channel between link 102 and link partner 104, FFE coefficients and/or DFE coefficients may be re-computed periodically.

2. EMI Detection, FFE and DFE Adaptation

Based on one or more of digital signal 252, adapted signal 260 and sliced signal 264, tone detector 302 detects electromagnetic interference 112 and the frequency of the electromagnetic interference 112. Tone detector generates signal 304 to indicate a frequency of the detected EMI 112. In an embodiment, an LDPC block has duration of 320 ns. Therefore, in 1 ms, there are 3,125 LDPC blocks present which allows for enough time for detection of EMI and determination of a frequency of the EMI within the 10 ms window described above.

If EMI 112 is very strong, then tone detector 302 uses power spectral density (PSD) of digital signal 252 to estimate the PSD of the detected EMI and its approximate frequency. To determine PSD of digital signal 252, a Fast Fourier Transform (FFT) of the digital signal 252 is computed. The FFT is averaged to account for noise. The magnitude of the FFT is the PSD of digital signal 252. A transient EMI signal is typically detected as a spike in the PSD. For example, as shown in FIG. 4B, transient EMI may produce a spike 414 that can be distinguished from the PSD of digital signal 252.

If EMI 112 is of moderate strength, then adapted signal 260 which is generated after echo cancellation and 3× NEXT cancellation may be used. PSD of adapted signal 260 is examined by tone detector 302 to determine presence of EMI and it approximate frequency.

If the EMI 112 is relatively weak, then a PSD of the difference between sliced signal 264 and slicer input signal 263 may be used by tone detector 302 to detect the presence of EMI and determine its frequency.

In an embodiment, upon detecting EMI, tone detector 302 generates a signal 304 that indicates frequency of the EMI signal. Based on the detected frequency of the EMI, FFE coefficients 278, and DFE coefficients 280 corresponding to the detected frequency are selected from the pre-computed FFE coefficients and DFE coefficients stored in memory 120. The selected FFE coefficients are applied to feed forward equalizer 222. The selected DFE coefficients 280 are sent to link partner 104 as will be described below. These DFE coefficients 280 are to be used by the pre-coder 206 of link partner 104 in order to communicate reliably in, for example, Double Squared Quadrature amplitude modulation (DSQ128) mode.

Figure 4A:
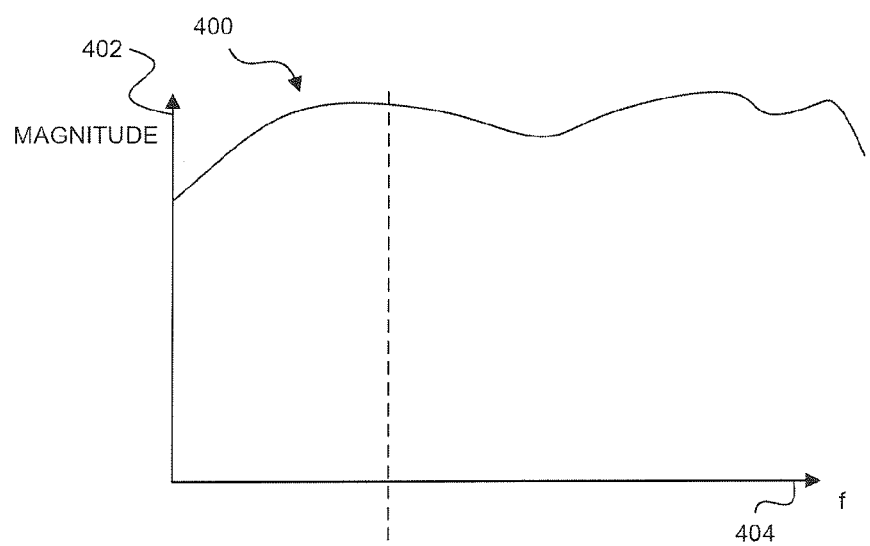
FIG. 4A illustrates a graph of a frequency response of a Feed Forward Equalizer (FFE).
Figure 4B:
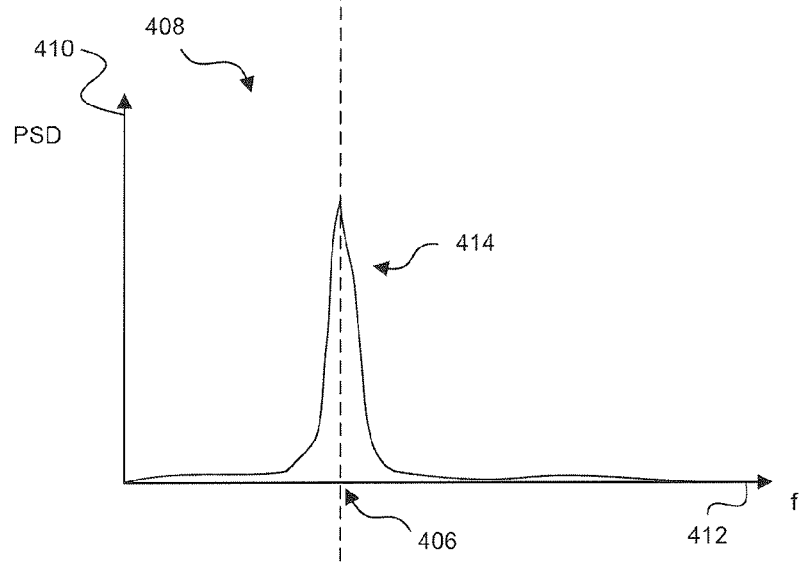
FIG. 4B illustrates a graph of Power Spectral Density (PSD) of EMI.
Figure 4C:
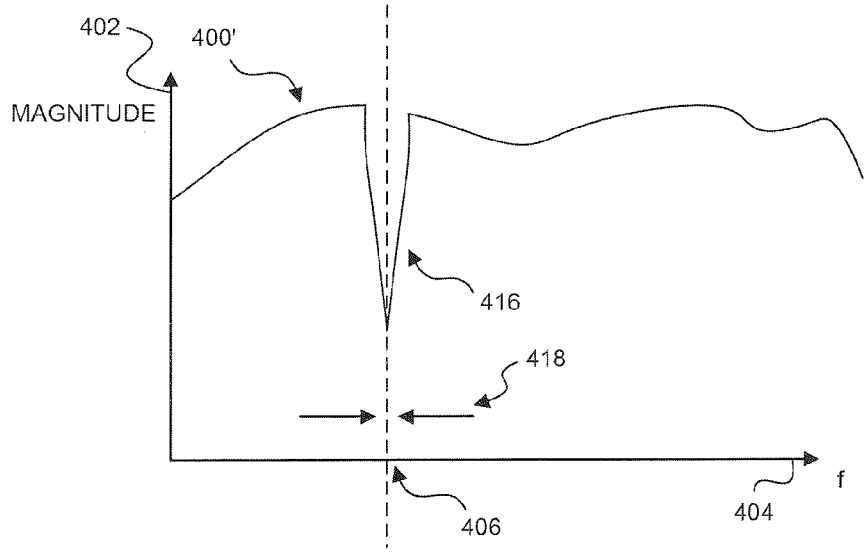
FIG. 4C illustrates a graph of a frequency response, of a feed forward equalizer, that has been modified to substantially eliminate the effects of EMI on a received signal according to an exemplary embodiment.

Consider an example where feed forward equalizer 222 has a frequency response 400 as shown in FIG. 4A. The X axis in FIG. 4A is frequency and the Y axis is the magnitude of the frequency response 400. FIG. 4B shows a graph of electromagnetic interference 408. The X axis in FIG. 4B is frequency 412 and the Y axis is power spectral density (PSD) of the EMI. In this example, an EMI spike 414 is detected at a frequency 406. In FIG. 4C, the adapted frequency response 400' of feed forward equalizer 222 includes a notch 416 at frequency 406 to notch out effects of EMI signal 414 from a received signal. In an embodiment, notch 416 is the result of modification of FFE coefficients 278. In an alternate embodiment, notch 416 is the result of a notch filter (not shown) applied to shaped signal 262. The width 418 of the notch 416 in frequency response 400' of feed forward equalizer 222 is equal to the width W of the frequency bin that covers frequency 416. In the above example, if frequency 416 is 151 MHz, width 418 of the notch 416 is approximately 3.125 MHz ranging from 150 MHz to 153.125 MHz. Since a 10 GBASE-T signal is wideband, notching out one or even a small number of bins from a frequency response of FFE 222 does not significantly reduce the received signal power.

The notch 416 in frequency response 400 may introduce ISI. As described further below, to account for this ISI, DFE coefficients 280 corresponding to the frequency bin of frequency 406 are transmitted to a link partner 104. For example, link 102 may transmit DFE coefficients to link partner 104 that correspond to the frequency bin that covers EMI frequency 406. Link partner 104 applies the DFE coefficients 280 to its pre-coder 206 since DFE 220 and pre-coder 206 are mathematically equivalent as described above. The modified response of pre-coder 206 removes ISI due to notch 416.

In an example, if the EMI source changes location (e.g a person walking with a walkie-talkie), the EMI frequency stays constant and hence the notch 416 is still applicable. In the case of Doppler Effect (for example in the case of EMI from an ambulance siren) changes the EMI frequency, the change is very small compared to the width W of the frequency bin for the notch 416. For example if the frequency of the EMI changes from 151 MHz to 150 MHz or 152 MHz, the notch 416 with a width of 3.125 MHz will still remove the EMI. Thus, a system adapted for one specific EMI location offers EMI suppression even when the EMI source changes location.

In an embodiment, the magnitude of notch 416 may be adjusted based on magnitude of EMI spike 414. For example, if EMI spike 414 is higher, then a proportionally deeper notch 416 may be used and vice versa.

In an embodiment, if previously detected EMI is not observed again at the same frequency 406 for a pre-determined period of time then the notch 416 corresponding to frequency 406 may be removed to prevent unnecessary degradation of channel SNR.

3. Alerting a Link Partner to Presence of EMI

In an embodiment, a pre-determined sequence of bits may be used to alert a link partner to the presence of EMI. For example, the 10 GBASE-T standard defines an unused 3.125 Mbps side channel to the 10 Gbps data channel. This side channel includes an "auxiliary bit" in each LDPC block. Auxiliary bits of consecutive LDPC blocks may be used to send a message to the link partner to indicate presence or absence of EMI. For example, an alternating sequence of "1010" in the auxiliary bits of four consecutive LDPC blocks might indicate absence of EMI. Four LDPC blocks may be considered to form a "frame." To indicate presence of EMI to a link partner, a link changes the auxiliary bit such that the alternating sequence of "1010" does not occur in 2 out of 3 consecutive frames. 2 out of 3 frames (i.e. 12 consecutive LDPC blocks) are used because it is expected that in the presence of EMI most of the bits including the auxiliary bit may be in error. Using 2 out of 3 frames provides extra robustness in the signaling mechanism in case of auxiliary bit errors. For example, in FIG. 5A, the alternating pattern is present in all 3 frames indicating to a link partner that no EMI is present. In FIG. 5B, the alternating pattern is not present in frame 2. However, this is not considered an indication of EMI since only 1 out of 3 frames are missing the alternating pattern. The broken pattern may be because of the rare occasion where the auxiliary bit is itself in error. However, the probability that 2 or more auxiliary bits to be in error in 2 out of 3 consecutive frames in the absence of EMI is extremely low. For example, in FIG. 5C, frames 2 and 3 are missing the alternating pattern indicating presence of EMI. Auxiliary bit alternation is used since it does not require both ends of a link to be synchronized in terms of auxiliary bit values. It is to be appreciated that other patterns, and bits other than the auxiliary bit may be used to indicate the presence to EMI to a link partner.

In a further embodiment, direct digital frequency synthesizer 310 generates a signal 312 that signals presence of EMI to a link partner. For example, direct digital frequency synthesizer 310 may generate and transmit a sine wave of a pre-determined magnitude and frequency to indicate the presence of EMI to a link partner.

4. Transmit Newly Computed, Adapted, or Presorted Coefficients to a Link Partner In addition to indicating presence of EMI, a link 102 may also transmit DFE coefficients to its link partner 104. The DFE coefficients are used by the pre-coder 206 of the link partner 104 to account for EMI 112 and the adapted frequency response of FFE 222 of link 102.

When EMI is coupled to the system, DFE coefficients transmitted to a link partner may not reliably reach the link partner if DSQ128 mode is in use. Therefore, in an embodiment, during the presence of EMI, both link 102 and link partner 104 switch to a Pulse-Amplitude Modulation 2 (PAM2) signaling mode which is more robust in the presence of EMI. Since the size of DFE coefficients that need to be exchanged is relatively small, the link partners may use a low complexity code, such as a repetition code. For example, assuming that 16 DFE coefficients are to be transmitted to the link partner with each code being 8 bits wide, the total data to be transmitted is 128 bits. Each LDPC block includes 256 samples taken at 800 MHz. If each sample represents a PAM2 signal, then in each LDPC frame we can transmit 256 bits. If a repetition code that uses 10 repetitions is used, then 5 LDPC frames are needed to transmit the DFE coefficients which will take 1.6 µs. This time to transmit the DFE coefficients is well within the 10 ms window described above to detect and correct the effects of EMI in system 100. In another embodiment, LDPC coding may be used in addition to repetition coding to further increase reliability of transmission.

In another embodiment, processor 118 in link 102 may transmit DFE coefficients corresponding to the determined frequency of the detected EMI to a link partner 104 by encoding the DFE coefficients 260 in a High-level Data Link Control (HDLC) packet. In another embodiment, only the frequency of the detected EMI is relayed to the link partner 104 by encoding the frequency in an HDLC packet. The link partner 104 uses the encoded frequency of the EMI to generate the DFE coefficients corresponding to the EMI frequency. In another embodiment, link partner 104 uses the frequency received from the link 102 to index a pre-computed table, such as table 1, to determine the DFE coefficients corresponding to the received frequency. Link partner 104 applies DFE coefficients to pre-coder 206 to adjust its response to account for EMI 112 and the adjusted response of FFE 222 and DFE 220 of link 102.

In a further embodiment, the frequency of signal 312 generated by direct digital frequency synthesizer 310 is of the same frequency as that of the detected EMI, thereby indicating the EMI frequency to the link partner. In yet another example, the magnitude of the sine wave signal 312 may indicate the magnitude of EMI 112. Link partner 104 may use the frequency of the sine wave signal 312 to select and/or compute the corresponding DFE coefficients. The magnitude of signal 312 may be used by link partner 104 to proportionally adapt the magnitude of DFE coefficients that are applied to pre-coder 206.

After exchanging the DFE coefficients, link partners use the adapted/computed FFE coefficients 278 and received DFE coefficients 280. It is expected at this stage that only 1-2 ms of the total 10 ms window allowed for less than 1% packet error rate has been used. The remaining portion of the 10 ms window may be used to: adapt/fine tune the 3× NEXT canceller coefficients 284, adapt/fine tune echo canceller 282, and fine tune other components of PHY 108' before returning to DSQ128 mode of transmission. In an example, upon detection of the presence of EMI, all adaptive filters (for example, echo canceller 230 and 3× NEXT canceller 232) as well as timing recovery integral loops may be stalled or frozen and released after DFE coefficients are exchanged in order to speed up the convergence of the adaptive filters.

The DFE coefficient transmission to link partner 104 can also be done by higher layers. For example, Link Layer Discovery Protocol (LLDP) can be used to send and maintain the computed Table 1 of DFE coefficients from time-to-time to the link partner 104 when there is no EMI. The advantage of this method of coefficient update is that the mode of transmission does not have to be switched from DSQ128 to PAM2 and back to DSQ128 to transmit DFE coefficients in the presence of EMI. In this example, it is sufficient to transmit to link partner 104, either the frequency of EMI, or an index into a table that includes DFE coefficients corresponding to different EMI frequencies.

FIG. 6 illustrates an example flowchart 600 depicting steps performed by a PHY layer transceiver to substantially eliminate EMI according to an exemplary embodiment. Flowchart 600 will be described with continued reference to the example operating environment depicted in FIGS. 1-5. However the flowchart is not limited to these embodiments. Note that some steps shown in flowchart 600 do not necessarily have to occur in the order shown.

In step 602, filter coefficients are pre-computed and stored prior to the onset of EMI. For example, processor 118 or LMS unit 234 computes feed forward equalizer coefficients 278 and decision feedback equalizer coefficients 280 and stores the computed coefficients in a memory such as memory 120. In an example, feed forward equalizer coefficients 278 and decision feedback equalizer coefficients 280 for multiple EMI frequency bins may be computed and stored as shown in table 1 above. In an alternate embodiment, step 602 is an optional step and feed forward equalizer coefficients 278 and decision feedback equalizer coefficients 280 are generated in real time by processor 118 or LMS unit 234.

In step 604, electromagnetic interference is detected in a received signal. For example, a power spectral density spike 414 as seen in FIG. 4B may be detected by tone detector 302. In an alternate example, errors in decoded output 268 of LDPC decoder 216 or a Cyclic Redundancy Check (CRC) error may be used to detect EMI. In a further example, a Signal-to-Noise Ratio (SNR) and/or a sudden drop in SNR may be used to detect EMI.

In step 605, all adaptive filters as well as timing recovery integral loops may be stalled or frozen and released or re-started after DFE coefficients are exchanged in order to speed up the convergence of adaptive filters In step 606, a frequency of the EMI detected in step 604 is determined. For example, tone detector 302 may detect a frequency 406 of EMI spike 414.

In step 608, feed forward equalizer coefficients and decision feedback equalizer coefficients are selected or computed corresponding to the frequency of EMI determined in step 606. In an example, LMS unit 234 computes feed forward equalizer coefficients and the decision feedback equalizer coefficients are selected from the table that is determined in step 602. In an alternative embodiment, processor 118 selects feed forward equalizer coefficients and decision feedback equalizer coefficients determined in step 602 based on the detected frequency in step 606. In an alternate embodiment, feed forward equalizer coefficients and decision feedback equalizer coefficients are computed in real time by processor 118 or LMS unit 234.

In step 610, the feed forward equalizer coefficients selected in step 608 are applied to the feed forward equalizer so as to substantially eliminate effects of the EMI from the received signal. For example, feed forward equalizer coefficients 278 are applied to feed forward equalizer 222 so as to modify a frequency response of feed forward equalizer 222 by creating a notch, for example notch 416 in FIG. 4C at the frequency 406 of the detected EMI.

In step 612, the presence of EMI is signaled to a link partner. For example, as described above, the direct digital frequency synthesizer 310 may generate a signal 312 to indicate presence of EMI to a link partner. In an alternative embodiment, a sequence of bits in a plurality of LDPC frames may be sent to the link partner to indicate presence of EMI.

In step 614, DFE coefficients corresponding to the detected EMI frequency and/or the EMI frequency may be sent to the link partner. For example, processor 118 of link 102 may send DFE coefficients computed in step 602 to a link partner in a HDLC frame. In another example, direct digital frequency synthesizer 310 may generate a sine wave signal 312 of a frequency equal to the EMI frequency and transmit the signal 312 to the link partner 104 to indicate the frequency of the EMI signal. Upon receiving the DFE coefficients, the link partner 104 may apply the received filter coefficients to pre-coder 206 so as to compensate for the notch created in the frequency response of feed forward equalizer 222 by link 102. In another example, upon receiving signal 312 indicating frequency of the detected EMI, the link partner may select a DFE coefficient from pre-stored DFE coefficients corresponding to the frequency indicated by signal 312.

FIG. 7 illustrates an example flowchart 700 depicting steps performed by a PHY layer upon receiving indication of EMI from a link partner, according to an exemplary embodiment. Flowchart 700 will be described with continued reference to the example operating environment depicted in FIGS. 1-5. However, the flowchart is not limited to these embodiments. Note that some steps shown in flowchart 700 do not necessarily have to occur in the order shown.

In step 702, a signal indicating presence of EMI is received from a link partner. For example, as described above, a sequence of bits in multiple consecutive of LDPC blocks may be received from a link partner indicating presence of EMI. In another example, a sine wave may be received from a direct digital frequency synthesizer 310 indicating presence of EMI.

In step 704, DFE coefficients and/or the frequency of the detected EMI may be received. For example, DFE coefficients for pre-coder 206 may be received in a HDLC frame or in a LLDP frame from the link partner. In an alternative embodiment, the frequency of the sine wave signal from direct digital frequency synthesizer 310 of the link partner may indicate the frequency of the electromagnetic interference detected by the link partner.

In step 705, FFE coefficients may be computed or looked up in a table based on the DFE coefficients and/or frequency of the EMI received in step 704. The FFE coefficients are applied to the FFE. For example, FFE coefficients may be applied to FFE 278.

In step 706, DFE coefficients are applied to a pre-coder to compensate for the effects of the notch in the feed forward equalizer of the link partner that sent the DFE coefficients in step 704. For example, DFE coefficients received in step 704 are applied to pre-coder 206. In an embodiment, processor 118, based on the frequency received in step 704, computes DFE coefficients 280 and applies them to pre-coder 206. In an alternative embodiment, based on the frequency received in step 704, LMS unit 234 computes DFE coefficients 280 in real time and applies the DFE coefficients to pre-coder 206. In alternate embodiment, processor 118 computes DFE coefficients 280 in real time and applies the DFE coefficients to pre-coder 206.

Single Ended EMI Adaptation

In an alternate embodiment, a link 102 upon detecting EMI may adjust the frequency response of its FFE 222, but not send DFE coefficients to the link partner 104. Instead, link 102 may activate its own DFE 220 and apply DFE coefficients corresponding to the detected EMI frequency to DFE 220 to account for the adapted frequency response of FFE 222. This alternate embodiment may be used in the event a link partner 104 is made by a different vendor than link 102, and hence does not implement the EMI elimination methods described herein. Steps performed in such an embodiment are described below with reference to FIG. 8.

FIG. 8 illustrates an example flowchart 800 that depicts steps performed by a PHY transceiver to substantially eliminate effect of EMI from a received signal according to an exemplary embodiment. Flowchart 800 will be described with continued reference to the example operating environment in FIGS. 1-5. However, the flowchart is not limited to these embodiments. Note that some of the steps in flowchart 800 do not necessarily have to occur in the order shown.

In step 802, filter coefficients corresponding to multiple frequency bins of EMI are pre-computed and stored prior to the onset of EMI. For example, processor 118 or least means squared unit 234 computes feed forward equalizer coefficients 278 and decision feedback equalizer coefficients 280 for multiple EMI frequencies and stores the computed coefficients in a memory such as memory 120. In an example, feed forward equalizer coefficients 278 and decision feedback equalizer coefficients 280 for multiple EMI frequency bins may be computed and stored as shown in Table 1 above. In an alternate embodiment, step 802 is an optional step and feed forward equalizer coefficients 278 and decision feedback equalizer coefficients 280 are generated in real time by processor 118 or LMS unit 234.

In step 804, electromagnetic interference is detected in a received signal. For example, a power spectral density spike 414 as seen in FIG. 4B may be detected by tone detector 302. For strong EMI signals, tone detector 302 may detect EMI using digital signal 252. For moderate strength EMI signals, tone detector 302 may detect EMI using adapted signal 260. For very weak EMI signals, tone detector 302 may detect the EMI using a difference between sliced signal 264 and slicer input signal 263.

In step 806, a frequency of the EMI detected in step 804 is determined. For example, tone detector 302 may detect a frequency 406 of EMI spike 414.

In step 808, feed forward equalizer coefficients and decision feedback equalizer coefficients are selected corresponding to the frequency of EMI determined in step 806. In an example, LMS unit 234 selects feed forward equalizer coefficients and decision feedback equalizer coefficients determined in step 802 for feed forward equalizer 222 and decision feedback equalizer 220 based on the frequency of the EMI detected in step 806. In an alternative embodiment, processor 118 computes feed forward equalizer coefficients and decision feedback equalizer coefficients determined in step 802 based on the detected frequency in step 806. The feed forward equalizer coefficients and decision feedback equalizer coefficients may also be selected from Table 1 above.

In step 810, the feed forward equalizer coefficients and decision feedback equalizer coefficients selected in step 808 are applied to feed forward equalizer 222 and decision feedback filter 220. For example, FFE coefficients 278 and DFE coefficients 280 selected/determined in step 808 are applied to feed forward equalizer 222 and decision feedback equalizer 220 respectively. Conventionally, decision feedback equalizer 220 is turned off after startup sequence. However, in this particular embodiment DFE coefficients 220 is turned on and no signal is sent to link partner indicated presence of EMI.

Embodiments presented herein, or portions thereof, can be implemented in hardware, firmware, software, and/or combinations thereof.

The embodiments presented herein apply to any communication system that may experience the adverse effects of EMI, or to any communication system where knowledge of the channel condition is known, or can be estimated at the transmitting or receiving side.

The representative signal processing functions described herein (e.g. part of whole of PHY 108') can be implemented in hardware, software, or some combination thereof. For instance, the signal processing functions can be implemented using computer processors, such as processors 118, computer logic, application specific circuits (ASIC), digital signal processors, etc., as will be understood by those skilled in the arts based on the discussion given herein. Accordingly, any processor that performs the signal processing functions described herein is within the scope and spirit of the embodiments presented herein.

Further, the signal processing functions described herein could be embodied by computer program instructions that are executed by a computer processor, for example processors 118, or any one of the hardware devices listed above. The computer program instructions cause the processor to perform the signal processing functions described herein. The computer program instructions (e.g. software) can be stored in a computer usable medium, computer program medium, or any storage medium that can be accessed by a computer or processor. Such media include a memory device, such as memory 120, a RAM or ROM, or other type of computer storage medium such as a computer disk or CD ROM, or the equivalent. Accordingly, any computer storage medium having computer program code that cause a processor to perform the signal processing functions described herein are within the scope and spirit of the embodiments presented herein.

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A method for reducing effects of Electromagnetic Interference (EMI) in an Ethernet system, comprising:
   computing and storing filter coefficients corresponding to a range of EMI frequencies;
   receiving a signal;
   detecting the EMI in the received signal;
   determining a frequency of the EMI;
   selecting a subset of the stored filter coefficients for a Feed Forward Equalizer (FFE) and a Decision Feedback Equalizer (DFE) corresponding to the determined frequency of the EMI; and
   adjusting a frequency response of the FFE and the DFE using the selected subset of the stored filter coefficients so as to reduce effects of the EMI in the received signal.

2. The method of claim 1, further comprising signaling a presence of the EMI to a link partner.

3. The method of claim 2, wherein signaling comprises: sending a predetermined sequence of bits in a plurality of consecutive frames to indicate the presence of the EMI to the link partner.

4. The method of claim 3, further comprising sending the predetermined sequence of bits using auxiliary bits.

5. The method of claim 1, further comprising transmitting a sine wave approximately equal in frequency to that of the EMI to signal a presence of the EMI to a link partner.

6. The method of claim 1, further comprising transmitting a sine wave based on a frequency of the EMI to signal a presence of the EMI to a link partner.

7. The method of claim 1, further comprising sending one or more of the selected subset of the stored filter coefficients to the DFE corresponding to the frequency of the EMI to a link partner.

8. The method of claim 1, further comprising sending one or more of the selected subset of the stored filter coefficients to the DFE by encoding the one or more of the selected subset of the stored filter coefficients in a High-level Data Link Control (HDLC) packet.

9. The method of claim 1, further comprising encoding a frequency in a High-level Data Link Control (HDLC) packet to send the frequency of the EMI to a link partner.

10. The method of claim 1, wherein detecting comprises: using a Power Spectral Density (PSD) of the received signal to distinguish the EMI from the received signal.

11. The method of claim 1, wherein detecting comprises: detecting the EMI based on an output of an analog-to-digital converter.

12. The method of claim 1, wherein detecting comprises: detecting the EMI based on an input to the FFE.

13. The method of claim 1, wherein detecting comprises: detecting the EMI based on a difference between an output of a slicer and an input of the slicer.

14. The method of claim 1, wherein determining comprises: determining the frequency of the EMI based on an output of an analog-to-digital converter, an input to the FFE or an output of a slicer.

15. The method of claim 1, further comprising performing the detecting, determining, selecting and adjusting steps in less than a pre-determined amount of time.

16. The method of claim 15, wherein the pre-determined amount of time is approximately 10 ms.

17. The method of claim 1, wherein the filter coefficients are for a notch filter.

18. The method of claim 1, wherein computing and storing comprises: computing the filter coefficients for the FFE and the DFE using a Least-mean-square (LMS) module.

19. The method of claim 1, wherein computing and storing comprises: storing the filter coefficients prior to detecting the EMI in the received signal.

20. The method of claim 1, wherein detecting, selecting, and adjusting are performed in a digital domain.

21. A system to reduce effects of Electromagnetic Interference (EMI) in an Ethernet system, comprising:
a processor configured to store filter coefficients corresponding to a range of pre-determined EMI frequencies;
a Feed Forward Equalizer (FFE) configured to adapt its frequency response using FFE filter coefficients selected from the stored filter coefficients corresponding to a frequency of the EMI so as to reduce effects of the EMI in a received signal; and
a Decision Feedback Equalizer (DFE) configured to adapt its frequency response using DFE filter coefficients selected from the stored filter coefficients corresponding to the frequency of the EMI so as to reduce the effects of the EMI in the received signal.

22. The system of claim 21, wherein the processor is further configured to send a predetermined sequence of auxiliary bits in a plurality of low-density-parity-check (LDPC) blocks to signal a presence of the EMI to a link partner.

23. The system of claim 21, further comprising a Direct Digital Frequency Synthesizer (DDFS) configured to send a sine wave approximately equal in magnitude and frequency to that of the EMI to signal a presence of the EMI to a link partner.

24. The system of claim 21, wherein the processor is further configured to encode the DFE filter coefficients in a High-level Data Link Control (HDLC) packet to transmit the DFE filter coefficients to a link partner.

25. The system of claim 21, wherein the processor is further configured to encode the frequency of the EMI in a High-level Data Link Control (HDLC) packet to transmit the frequency of the EMI to a link partner.

26. The system of claim 21, further comprising a tone detector configured to detect the EMI and the frequency of the EMI based on an output of an analog-to-digital converter.

27. The system of claim 21, further comprising a tone detector configured to detect the EMI and the frequency of the EMI based on an input to the FFE.

28. The system of claim 21, further comprising a tone detector configured to detect the EMI and the frequency of the EMI based on an output of a slicer.

29. The system of claim 21, wherein the FFE comprises: a configurable notch filter configured to remove the EMI.

30. The system of claim 21, wherein the processor is further configured to select the FFE filter coefficients or the DFE filter coefficients corresponding to the determined frequency of the EMI.

31. A method to reduce effects of Electromagnetic Interference (EMI) in an Ethernet system, comprising:
receiving a signal from a link partner indicating a presence of the EMI;
receiving filter coefficients for a programmable pre-coder from the link partner corresponding to the EMI; and
adjusting a frequency response of the pre-coder using the received filter coefficients so as to reduce effects of the EMI on the received signal.

32. The method of claim 31, wherein the programmable pre-coder is a Tomlinson-Harashima pre-coder.

33. A non-transitory computer readable medium having stored thereon computer executable instructions that, when executed by a computing device, cause the computing device to perform a method comprising:
computing and storing filter coefficients corresponding to a range of Electromagnetic Interference (EMI) frequencies;
receiving a signal indicating a presence of EMI and a frequency of the EMI;
selecting a subset of the stored filter coefficients for a Feed Forward Equalizer (FFE) and a Decision Feedback Equalizer (DFE) corresponding to the frequency of the EMI; and
adjusting a frequency response of the FFE and the DFE using the selected subset of the stored filter coefficients so as to reduce effects of the EMI in the received signal.

* * * * *

UNITED STATES PATENT AND TRADEMARK OFFICE
CERTIFICATE OF CORRECTION

| | | |
|---|---|---|
| PATENT NO. | : 8,842,767 B2 | Page 1 of 1 |
| APPLICATION NO. | : 12/771722 | |
| DATED | : September 23, 2014 | |
| INVENTOR(S) | : Esmailian et al. | |

It is certified that error appears in the above-identified patent and that said Letters Patent is hereby corrected as shown below:

In the Claims

In column 15, line 34, replace "FFE or" with --FFE, or--.

Signed and Sealed this
Thirtieth Day of June, 2015

Michelle K. Lee
*Director of the United States Patent and Trademark Office*